Figure 1:
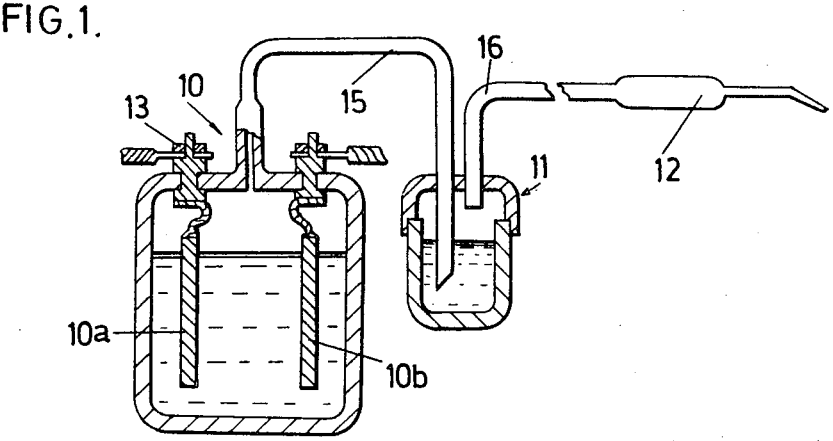

United States Patent [19]

Brown

[11] 4,014,777

[45] Mar. 29, 1977

[54] WELDING

[76] Inventor: Yull Brown, 182 Auburn Road, Auburn, New South Wales, Australia

[22] Filed: July 19, 1974

[21] Appl. No.: 489,921

[30] Foreign Application Priority Data

July 20, 1973 Australia ............................ 4159/73
May 2, 1974 Australia ............................ 7418/73
Aug. 3, 1973 Australia ............................ 4341/73

[52] U.S. Cl. .................................. 204/270; 429/21; 204/129; 204/228; 204/229; 204/268; 204/269; 204/272; 431/354

[51] Int. Cl.$^2$ ...................... C25B 1/02; C25B 1/04

[58] Field of Search .......... 204/129, 270, 278, 228, 204/230, 237, 269, 229, 272, 271; 136/86 R; 55/3, 100; 29/498.5; 219/137; 431/354; 206/.7

[56] References Cited

UNITED STATES PATENTS

| 685,274 | 10/1901 | Haas | 204/268 |
|---|---|---|---|
| 1,600,478 | 9/1926 | Lawaczeck | 204/272 X |
| 3,045,665 | 7/1962 | Movat | 204/129 X |
| 3,177,633 | 4/1965 | McDonald, Jr. | 55/3 X |
| 3,262,872 | 7/1966 | Rhodes et al. | 204/129 X |
| 3,310,483 | 3/1967 | Rhodes | 204/129 X |

*Primary Examiner*—Arthur C. Prescott
*Attorney, Agent, or Firm*—Hill, Gross, Simpson, Van Santen, Steadman, Chiara & Simpson

[57] ABSTRACT

This invention relates to welding, brazing or the like utilizing a mixture of hydrogen and oxygen generated in substantially stoichiometric proportions in an electrolytic cell by electrolytic dissociation of water, the mixture so generated being passed from the generator through a flash-back arrestor and thence to a burner where the gases are ignited. The invention also relates to atomic welding in which the above mentioned mixture is passed through an arc causing dissociation of both the hydrogen and oxygen into atomic hydrogen and oxygen which on recombination generate an intensely hot flame.

6 Claims, 7 Drawing Figures

U.S. Patent  Mar. 29, 1977  Sheet 1 of 4  4,014,777

WELDING

This invention relates to welding, brazing and the like, utilizing hydrogen and oxygen, and extends to such applications as oxy-welding, oxy-cutting, atomic welding, and welding or cutting in combination with electric arc techniques. The invention also provides for the generation of hydrogen and oxygen for the above-mentioned applications in combination therewith or separately.

A most important application of the invention is atomic welding utilizing the properties of atomic oxygen in combination with atomic hydrogen (for welding) or atomic oxygen separately (for cutting). This particular application of the invention is based, among other things, on the appreciation that considerable energy is associated with the dissociation of molecular oxygen into atomic oxygen by passing this gas through an arc, and that this property can be usefully employed to generate temperatures even higher than those previously attainable with, for example, an atomic hydrogen flame. The significance of the energy which can be obtained in this way can be appreciated from the following reactions that take place, and the heat energies associated therewith, when hydrogen and oxygen are both passed through an electric arc. Thus:

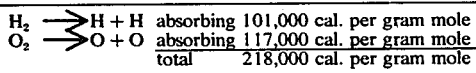

On recombination of these atoms this energy is released as heat through a number of complex chemical reactions and results in an extremely high flame temperature. Previously it would not have been considered possible to practically pass oxygen or a mixture of oxygen and hydrogen together through an arc due to the highly explosive or inflammable nature of such gases. However in accordance with the concepts of the present invention this is indeed both possible and practical and, as mentioned above, enables the realization of much higher welding or cutting temperatures than hitherto obtainable by known practical means.

One of the objects of the present invention is to provide a method and apparatus whereby hydrogen and oxygen can be generated quickly and conveniently for immediate use for welding, etc., without many of the disadvantages associated with conventional gas welding practice. For example, the practice of employing cylinders (or "bottles") of gas, usually oxygen and acetylene can have significant disadvantages, particularly for users working remote from a supply depot and for whom there might be an appreciable delay between the placing of an order for a delivery of gas the the actual delivery. For such users, in order to ensure an adequate supply of gas when a particular job demands it, it is often necessary to order fresh supplies in advance, even before the supply on hand is fully used, or else risk running out of gas before a job is completed. Since bottles of gas are generally delivered on a strictly exchange basis — in that a used bottle must be returned in exchange for a refilled bottle — the practice can mean a significant waste, as far as the user is concerned, if bottles containing useful amounts of unused gas have to be returned to the supplier.

The practice of using bottled gas also has associated with it a large number of other problems such as the possibility of gas leaking from bottles, possibility of industrial disputes which can result in severe delays in delivery and in supply shortages, liabilities, high purchase and storage costs, freight charges, and so on.

To illustrate some of the conditions which the consumer of bottled gas must put up with, listed below is a summary of the "conditions of sale" which apply to the sale and distribution of bottled gas.

a. The cylinder remains the sole property of the supplier, which retains the right to exercise at any time its proprietory powers in its discretion.

b. All cylinders and contents are forwarded at the expense and risk of the customers.

c. It is the responsibility of the customers to provide adequate labour for the loading and unloading of all cylinders at the premises.

d. Cylinders are to be returned to the supplier as soon as empty, carriage and freight charges paid.

e. A cylinder is not 'returned' until received by the supplier at its works or warehouse or by its truck and a receipt on the suppliers form given for the same. No document purporting to be a receipt for any such cylinder shall be valid unless it is the suppliers printed form of receipt.

f. Cylinders are not transferable and must not be used for any purpose other than as containers for the gas sold by the supplier and must not be delivered or sent for recharging to any place other than the suppliers gas station.

g. The customer agrees not to resell to any person or Corporation, the gas contents of the cylinders of any part thereof.

h. Customers are held responsible for all loss or damage to cylinders from whatever cause arising from the time of delivery until returned to the suppliers. (Customers are advised to cover the cylinders by insurance).

i. Where a customer has not returned a cylinder in good order and condition within six months from the date of delivery, the supplier may, at its option, charge the customer with an amount not exceeding the agreed value of the cylinder and the demurrage due in respect thereof, and such amount is payable by the customer as liquidated damages for the detention of the cylinder. Notwithstanding the payment of such amount in respect of any cylinder, it remains the property of the suppliers and the right of the suppliers to recover possession thereof is not affected in any way.

j. No allowance is made on any residual gas returned in the cylinders.

k. And many other conditions varying in the different countries in the world.

Another disadvantage, which is associated with oxy-hydrogen welding arises due to the marked ability of hydrogen to be absorbed by most metals. Thus when welding steel, for example, great care must be taken to ensure that excess hydrogen is not present otherwise it will be absorbed in the metal to cause loss of strength and brittleness. On the other hand, an excess of oxygen would cause burning of the metal and should thus equally be avoided. It is most important therefore that with oxy-hydrogen welding the mixture at the burner be adjusted to produce a neutral flame, that is, one in which there is neither excess hydrogen nor excess oxygen. In practice it is most difficult to maintain (and virtually impossible to judge by flame colour) a neutral flame, and for that reason oxy-hydrogen welding is not widely used despite the inherent advantages of low cost and high heat value offered by hydrogen as a fuel.

These and other disadvantages can be overcome to a significant extent by the present invention whereby hydrogen and oxygen fuel are generated simultaneously by electrolysis in an electrolytic cell and allowed to freely mix therein to form a stoichiometric mixture that will burn with a neutral flame. The fuel gas can be generated where and whenever required thereby eliminating the need for storage of bottles of gas and reliance on regular deliveries of gas which often cannot be guaranteed.

The method of the present invention requires no diaphragms or the like to separate the hydrogen and oxygen liberated by the electrolysis process and thereby enables considerable advantages to be realized over conventional electrolytic production of these gases. Such diaphragms have normally been regarded as essential for conventional electrolytic generators in order to separate the two gases that would otherwise form a highly explosive mixture; however, it has been found, in accordance with the present invention, that the two gases can be safely, and usefully, produced and utilized as a mixture for fuel purposes provided that suitable safety precautions, such as the employment of a flash-back arrestor, are taken. Such safety precautions may include, for example, the employment of a device which removes electrolyte vapour from the gas and at the same time acts as a flash-back arrestor. In obviating the need for diaphragms or the like the present invention enables the electrodes to be placed much closer together and avoids the high resistance associated with diaphragms, which in turn enables a significant increase in the rate of gas production for a given size of apparatus. In short the present invention enables the manufacture of small size equipment that is useful for a large variety of welding and similar work and that is not prohibitively bulky for the average situation: something which is impossible with conventional hydrogen-oxygen generating equipment.

In the development of apparatus from the basic concept of generation of hydrogen and oxygen electrolytically in a practical manner suitable for large industrial applications on the one hand, and small domestic applications on the other hand, a number of factors had to be taken into account, analysed and weighed one against the other. The following is a list of some of these factors to illustrate what has been involved.

a. Endosmotic pressure to be balanced against the hydrostatic pressure of the fluid.

b. Rate of flow of electric current in relation to the area of the electrodes.

c. The prior art problem of removing the gases from anolyte and catholyte, before diffusion and before the electrolytes are intermixed.

d. Effects of rapid changes in the rate of flow of electricity through the cell.

e. Effects of auxiliary decomposition within the anode and cathode sides of the cell.

f. The choice of the most readily ionized electrolyte of a maximum conductivity.

g. The least possible spacing between anode and cathode that can be employed.

h. A design of cell in which previously it was regarded impossible for the $H_2$ and $O_2$ given to become mixed with safety, which does away with diaphragms or the like which would increase the internal resistance, in which both hydrogen and oxygen can be mixed within the cell, and in which cells can be connected in series, parallel, or parallel and series to suit requirements.

i. The choice of materials for the electrodes.

j. The quantity of acids or alkali to be used.

k. The shapes of cells according to purpose of the cells, and the application for which they are designed.

l. The possibility of improvement with permanent or electro-magnetically induced fields applied to the electrolytic cells, to cause controlled separation of a quantity of the gases generated in the cells.

m. Ensuring effective circulation of electrolyte between the electrodes, with as little electrical resistance as possible.

n. The possibility of using sodium hydroxide or potassium hydroxide which, in concentrations from 10% up to 30%, which has negligible corrosion action on iron or nickel electrodes, apart from producing a solution of good conductivity.

o. The use of the cooling effect by passing of hydrogen and oxygen gases, for cooling electrolyte in the cell, for controlling the cell temperature, preferably between 40° C to 60° C, at which temperature the bonds between hydrogen and oxygen need a minimum of electrical energy to break.

p. The separation of hydrogen and oxygen from a mixture, using, possibly, a permanent magnetic field, or an electro-magnetic field which can be controlled to obtain a desired separation between the hydrogen and oxygen. Based on this principle, the oxygen could be substantially separated from the mixture and the hydrogen could be absorbed by, for example, selected metals, which have high absorption affinity for hydrogen (for example, paladium which absorbs 900 times more hydrogen from its volume). Also, using the principle of the invention, hydrogen and oxygen can be generated in large quantities with small units and the oxygen could, for example, be separated and used to supply hospitals, baby rooms, air conditioning systems, or for any other application, when oxygen is required. Oxygen can, in this way, be generated much faster and more conveniently than with conventional electrolytic generating equipment.

q. The possibility of absorbing the hydrogen or oxygen by specially selected materials in small containers and where the absorbed gas can be extracted when desired for welding or brazing where it would be inconvenient or impossible to do so with conventional equipment.

r. Making the welding operator entirely independent of any gas suppliers.

s. The generation of cheap gas, up to 6 to 7 times cheaper than normal gas supplies.

t. The design of equipment which gives not only professional welders, but handymen, or people who would like to do welding at home with oxy-welding apparatus, but would do it only occasionally and could not justify the expense associated with conventional gas supplies. Such people cannot justify paying for bottles of gas for a single welding only (having to keep the bottles, paying rent for them to keep them up to two years, to perform the next welding). For this reason, the welding apparatus made possible by the present invention is ideal because it produces gases for welding at the time and in the quantity that is needed.

u. Hydrogen-oxygen welding has the advantage that it does not pollute the atmosphere as does oxy-acetylene welding.

v. The design of electrolytic cells which are safe to use as well as convenient, which cells may incorporate their own flash-back arrestors as a safety precaution or an equivalent means, to prevent the hazards of explosion or fire.

w. The control of the current which passes through the cells, the temperature of the cell, which is a function of current, the control of the separation of the gases, and the removal from the gases of electrolyte vapours. In this regard there has been designed a special unit with preferably conical electrodes, and a flash-back arrestor. The flash arrestor may be constituted by a pellet of porous material, or a long capilliary pipe located between the gas generator and a burner head. The fire hazards associated with a mixture of hydrogen and oxygen cannot be overemphasized and indeed it is probably mainly because of the recognized dangers associated therewith that extreme lengths have been taken to separate the two gases completely until they reach the burner. In accordance with the present invention it has been realized that, contrary to long standing opinions, the gases can be safely mixed together even when being produced and as a result many desirable advantages can be realized.

x. The provision of one or more safety valves adjusted to convenient pressure for releasing excessive pressures in the cell (for example, greater than 30 p.s.i.) which may result, for example, if a current control mechanism fails. The safety valves could be attached to an alarm, for example, to indicate a failure in the current control mechanism or the cut-off switches, etc.

y. Porous material may conveniently be placed in the burner head, so that backfire through the burner into the cell cannot occur.

In summary, the present invention contemplates, as an important feature thereof, a universal welding apparatus capable of being used to perform different types of welding operations based on the utilization of hydrogen and oxygen, making full use of the advantages which can thereby be realized, and equipment which can be made small and portable compared with existing apparatus such as that presently used for gas welding using bulky bottled hydrogen. To generate the fuel, in accordance with the invention a small compact electrolytic cell is made possible in which the only raw material which has to be replenished from time to time is water and which can be used whenever a source of electrical energy is available to supply the necessary amount of hydrogen or hydrogen and oxygen mixture for performing atomic welding or hydrogen-oxygen flame welding. In its simplest form, the gas generating apparatus of the present invention comprises an electrolytic cell adapted to be connected to an energy source, optionally through a step down transformer and rectifier, and having means for connection to a burner, preferably through a flash-back arrestor as a safety precaution.

The apparatus may be combined with a transformer as a single compact unit and for convenience the transformer may be provided with several windings to enable it to be used for auxiliary purposes such as battery charging, electroplating, arc welding or to provide an arc for atomic welding.

It has been found that a single electrolytic cell operating without diaphragms at several hundred amps will generate hydrogen and oxygen at a reasonable rate for small welding and brazing work but for larger work (for example, the welding of 10 mm steel plate) the required amperage becomes excessive (typically of the order of 900A or more) when considering the size of conductors and transformer and the problem of heat generation. Accordingly, in one aspect of the invention these problems can be significantly reduced by arranging a plurality of cells in series and using a much smaller current to obtain the same effective gas output. In effect the capacity of a series of cells for a given current input is that of a single cell multiplied by the number of cells. Alternatively the current requirement is reduced by a factor equal to the number of cells — for a given rate of gas production.

Even so a large number of separate cells can be excessively bulky for portable applications and in a further aspect of the invention, therefore, the bulk can be greatly reduced by arranging the cells as a single unit in which a number of electrodes, effectively in series, are arranged adjacent each other in a common electrolytic chamber, the chamber being provided with a gas collection space and an output for connection to, for example, gas burner means. Furthermore, only the end electrodes need be connected to an external source of electrical energy and the arrangement as a whole can be made extremely efficient and compact. Additionally the need for a transformer for most applications can be eliminated by such an arrangement so that the apparatus can be designed to be electrically connected directly to a main electrical supply, through a bridge rectifier if desired. By eliminating the need for a transformer, the gas generating equipment as a whole can be made surprisingly compact, to be well suited for small domestic requirements as well as heavy industrial requirements.

In another important aspect of the invention, there is provided a safety device which monitors the pressure of hydrogen and oxygen being generated and regulates the current flowing through the cell(s) to increase or decrease the rate of gas production depending on the pressure. In one form the device comprises a chamber containing two electrodes, at least one of which is conical, arranged in the chamber (which normally contains a conductive liquid) and the electrodes being connectable in series with one or more electrolytic cells used for oxygen-hydrogen production.

The pressure responsive, current regulating device can be designed as an integral part of the electrolytic cell(s) or can be used as an attachment connectable externally and in series with the gas generating cell(s). The device can also be designed to combine the functions of a current regulating device and a flash-back arrestor, the latter function ensuring that a flame at the burner does not accidentally pass back through the hose lines to the highly explosive mixture in the gas generating cell(s). The device may incorporate a total current cut-out feature or may be used in combination with a cut-out device which fully interrupts the supply of electrical power should the pressure in the cell(s) accidentally exceed a maximum safe value. The current regulating device may also operate to regulate the current passing through the cells in accordance with the temperature to maintain the temperature within a desired range.

Referring to the drawings, FIG. 1 shows schematically a single electrolytic cell 10 operating to produce a mixture of hydrogen and oxygen, which mixture is passed through a flash-back arrestor 11 to a burner 12. The cell 10 contains two plate electrodes 10a and 10b immersed in an electrolyte consisting of a solution of KOH in water and connectable through terminals 13 and 14 respectively to a source of a.c. or d.c. electricity. Preferably, d.c. is used as the electrical impedance of the cell, is much lower for d.c. than for a.c. The source of electricity may be a transformer, typically of 300 Amps output rating, connected to the cell through a bridge rectifier. The flash-back arrestor 11 is constituted by a water bath in which gas liberated in the cell 10 passes through a tube 15 into the water bath 11 and thence through a tube 16 to the burner 12. The arrangement is suitable for small welding and brazing work but becomes too bulky for very large work.

Figure 2:
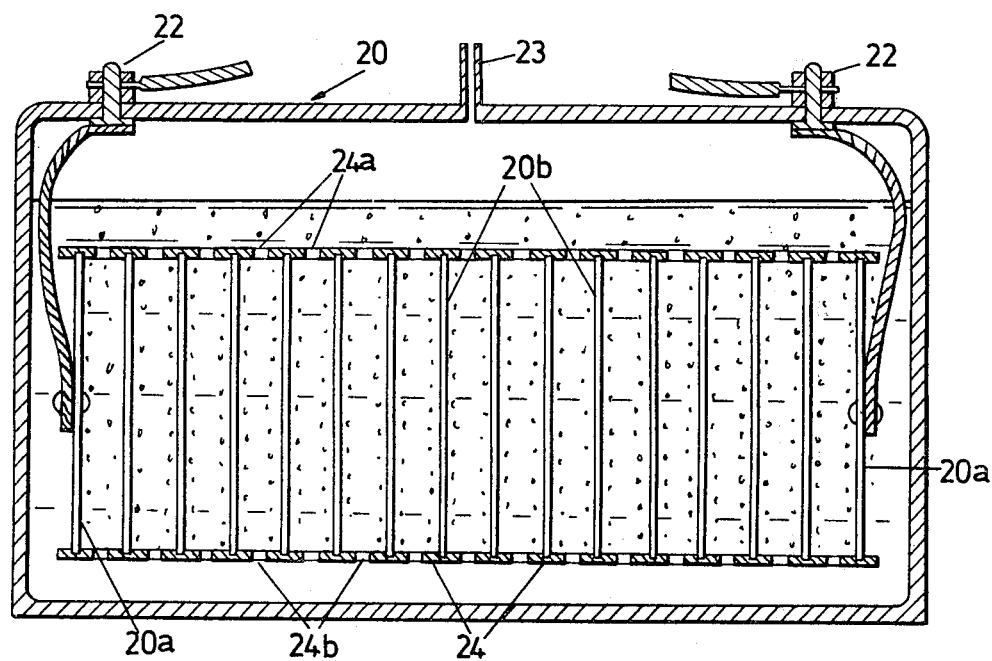

FIG. 2 illustrates in vertical cross-section an electrolytic cell 20 which requires a much lower current than the cell illustrated in FIG. 1 for a given current input. The cell 20 comprises what is in effect a series of cells constituted by a plurality of plate electrodes immersed in a solution of KOH in water. For convenience the electrodes are designated as 20a for the two electrodes at the ends and 20b for the intermediate electrodes. The electrodes 20a are connected, via conductors 21 to terminals 22 for connection to an external supply of electricity. The mixture of hydrogen and oxygen which is evolved at the electrodes when an electric current is applied, passes through an outlet opening 23 to a flash-back arrestor and thence to a burner (not shown in FIG. 2). The series of electrodes 20a and 20b are sealingly mounted in a tube 24 of insulating material which is provided with restricted apertures 24a at the top and 24b at the bottom, between each pair of electrodes. The apertures 24a permit gas to escape into the space 25 above the surface of the electrolyte and the apertures 24b permit electrolyte to enter freely into the spaces between each pair of electrodes. By virtue of this arrangement the electrical resistance between any two adjacent electrodes is far less than that between non-adjacent electrodes so that the arrangement is effectively one of a large number of individual cells connected in series. A very compact arrangement is therefore obtained but one which permits a relatively high gas production rate for a reasonably low current input. For example, a structure like that shown, consisting of the equivalent of, for example, 120 cells can generate gas at a current input of 15A (at, for example, 240V) equal to that of a single cell requiring a current input of approximately 1800A. This means in practice that a relatively portable apparatus can be produced which can be connected directly, without a transformer, to most domestic electrical supplies and which can maintain a sufficient rate of gas production for most types of welding work.

An advantage which particularly distinguishes the arrangements disclosed from conventional gas welding apparatus is that the hydrogen and oxygen are automatically produced in substantially the correct proportions to give a neutral flame. No mixing valves are required and even unskilled personnel can produce satisfactory welds without difficulty. In fact indications are that many welds can be produced better than by any other welding process.

Figure 3:
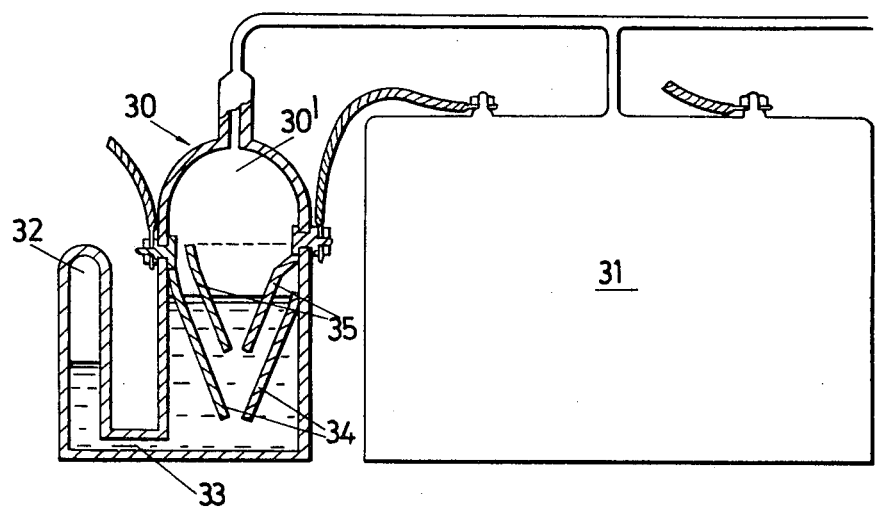

FIG. 3 illustrates a pressure responsive safety device 30 operably connected in series (electrically) with an electrolytic hydrogen-oxygen cell 31 for regulating the current passing therethrough in accordance with the gas pressure being generated. The device, or cell 30 comprises a chamber 30' in communication with a reservoir 32 via a passage 33. Two conical electrodes 34 and 35 are mounted in spaced relation within the chamber and connected in series between a d.c. source (not shown) and the electrolytic cell 31. An electrolytic solution of KOH and water is provided within the chamber, portion of which enters the reservoir 32. When the cell 31 is operating to produce hydrogen and oxygen the pressure of the gas being produced acts on the surface of the electrolyte in the chamber 30' to displace an amount of the electrolyte into the reservoir 32 against back pressure exerted by air trapped in the reservoir, the amount of electrolyte displaced depending on the pressure of the gas in the chamber 30'. At the same time the area of contact between the electrodes and the electrolyte in the cell 30 reduces in proportion to the drop in electrolyte level, causing the electrical resistance of the cell 30 to rise and the current passing therethrough to fall. Should the gas pressure drop the electrolyte level in the cell 30 will rise and the current passing into the cell 31 will also rise. Thus the cell 30 operates to regulate the rate of gas production in accordance with the pressure produced and prevents excess gas pressure to build up in the cell 31.

Figure 4:
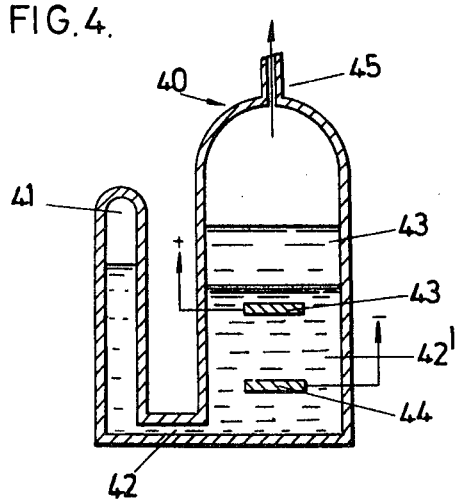

FIG. 4 illustrates an alternative form of safety device which is operable to make or break the connection between an electrolytic hydrogen-oxygen cell (not shown in FIG. 4) and an electric current source. The device comprises a cylindrical container 40 in fluid communication with a liquid reservoir 41 via a passageway 42, and a quantity of mercury 42' contained in the container and reservoir. Two electrodes 43 and 44 are disposed one above the other in the container 40 and are normally immersed in the mercury with a conductive path thereby formed between them. The container is connected electrically in series with an electrolytic cell (or cells) and in gaseous communication therewith through a hose 45. An increase in gas pressure resulting from generation of gases by the electrolytic cell(s) causes the mercury to be displaced towards the reservoir and the mercury level in the container 40 to fall. When the pressure exceeds a predetermined level the mercury level falls below that of the electrode 43 and electrical connection between the two electrodes is broken. The electrical connection is again restored when the gas pressure falls. A non-inflammable liquid, such as silicone oil or freon is provided on top of the mercury to ensure that any arc which may be generated between the electrode 43 and the mercury is totally isolated from the gases above the liquids.

Figure 5:
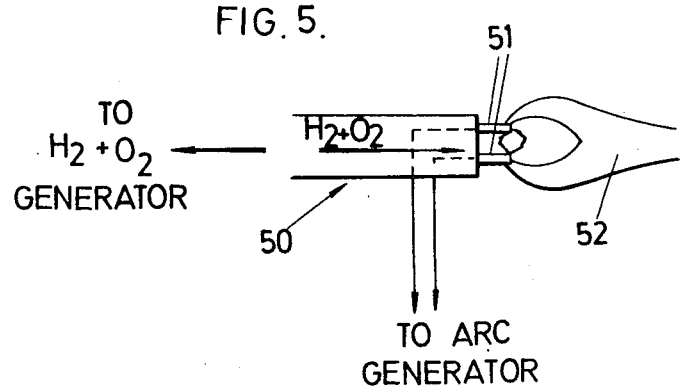

FIG. 5 shows schematically an arrangement whereby an exceedingly hot flame can be produced using the gaseous mixture generated electrolytically by the apparatus previously described. In this arrangement a mixture of hydrogen and oxygen, preferably in stoichiometrical proportion, is passed via a line 50 between a pair of tungsten electrodes 51 to produce molecular dissociation of the hydrogen and the oxygen and a very hot flame 52. It can be appreciated that whereas in an atomic hydrogen flame a significant temperature rise is obtained by striking an arc in the hydrogen, an even greater temperature rise can be realized by striking the arc between the oxygen as well since the dissociation energy of molecular oxygen is of the same order of magnitude as that of molecular hydrogen.

Figure 6:
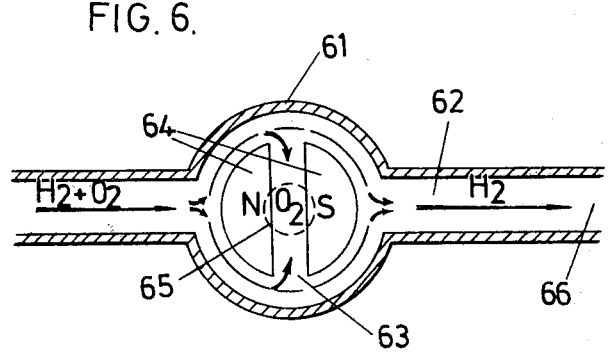

FIG. 6 illustrates an arrangement for the magnetic separation of oxygen from a mixture of oxygen and hydrogen, whereby the oxygen can be used for flame cutting. The apparatus consists of a chamber 60 containing a magnet 61 and is located in a conduit 62. A mixture of hydrogen and oxygen is passed through the conduit and around the magnet 61. The diamagnetic oxygen is diverted by the magnetic field into a transverse passageway 63 to a central conduit (not shown) leading from this passageway and thence to a flame-cutting head. The paramagnetic hydrogen continues along the conduit, past the magnet and can be allowed to escape or can be collected, as desired. If the magnet is an electromagnet it can be turned off when hydrogen and oxygen is required as a mixture, and in that case the downstream side of the conduit 62 can be closed off to prevent the loss of gas.

Figure 7:
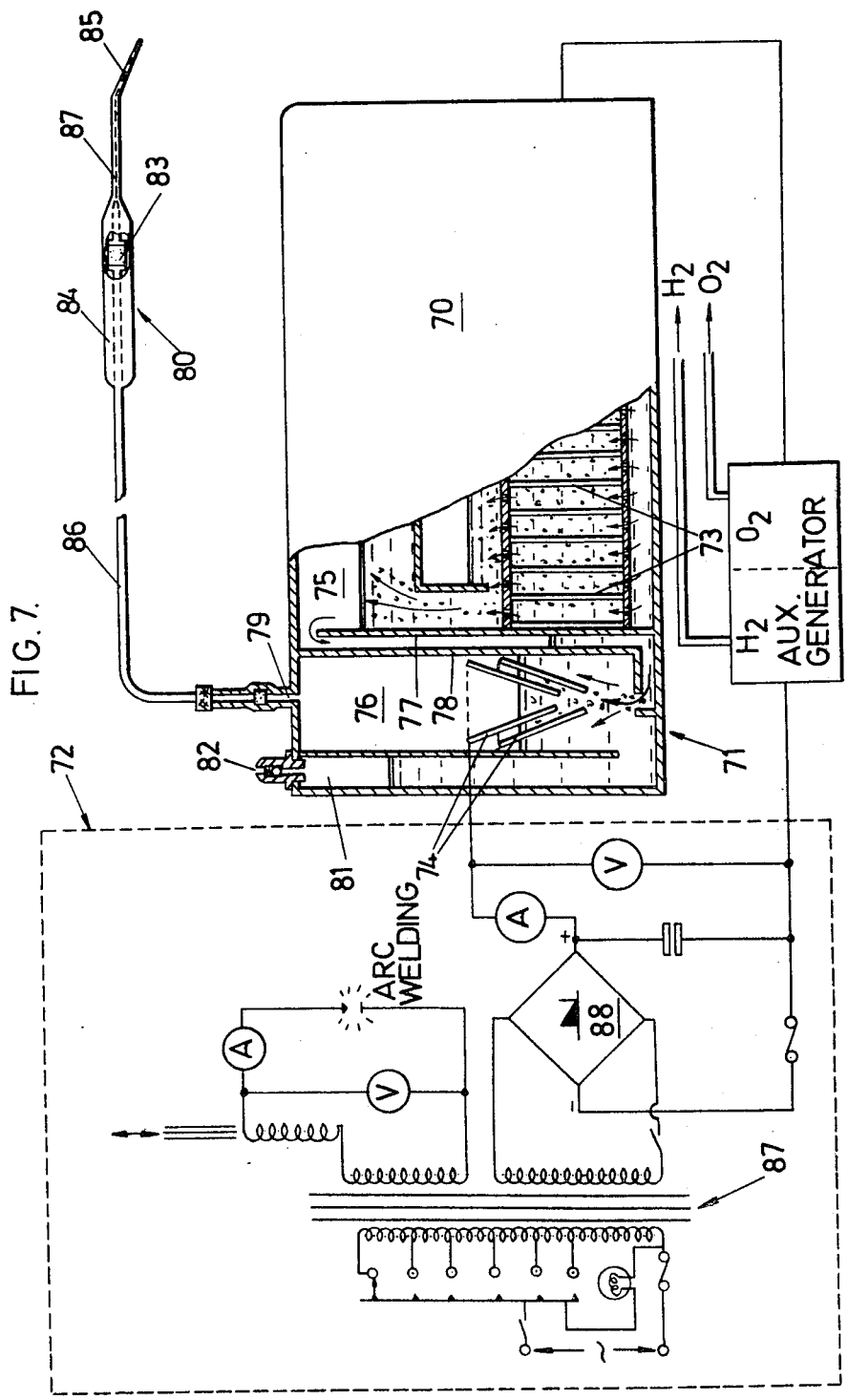

FIG. 7 illustrates a complete oxy-hydrogen generator and welding apparatus comprising a gas generator 70, a current regulating cell 71 and a power supply 72. The construction of the electrodes 73 of the generator 70 and 74 of the cell 71 are identical with those illustrated in FIGS. 2 and 3 respectively. In this arrangement, however, the gas generator 70 and cell 71 are combined as an integrated unit and as such has some features not found in the arrangements shown in FIGS. 2 and 3. In particular the chamber 75 of the generator 70 and the chamber 76 of the current regulator cell 71 are separated by two partitions 77 and 78 defining between them a passageway communicating between the two chambers. The respective electrodes of the cell 71 and a generator 70 are connected electrically in series with the power supply.

Gas produced by electrolysis in the chamber 75 rises into the space in the chamber above the electrodes 73, passes down the passageway between the partitions 77 and 78, bubbles through the electrolyte in the chamber 76 and thence passes through an outlet opening 79 to a burner 80. An air trap reservoir 81 is formed integrally with the cell 71 and is in liquid communication therewith through an opening between the bottom of the reservoir and the cell. When the pressure of the gas generated by the generator 70 rises, this pressure causes the electrolyte in the chamber 76 to be displaced into the reservoir 81 resulting in a reduction of the current being passed to the generator 70 by the mechanism previously described in relation to FIG. 3 of the drawings. In this way the cell 71 effectively monitors the gas pressure and regulates the current to maintain an approximately constant pressure. To ensure against the possibility that the pressure should accidentally exceed a predetermined maximum safe value, a spring-loaded safety pressure valve 82 is provided at the top of the reservoir 81 to release the excess pressure into the atmosphere.

The burner 80 is provided with a flash-back arrestor in the form of a porous ceramic pellet 83 located in the gas flow path between the handle part 84 of the burner and the burner tip 85. The flash-back arrestor acts by quenching any flame blowing back into the burner before the flame has a chance to reach the hose 86 connecting the burner with the gas generator.

The power supply is of the universal type, that is, it is provided with a transformer 87 connectable to an alternating current electrical supply and provided with a number of electrical outlets for various purposes. One winding of the transformer is connected to a bridge rectifier which provides the d.c. current for the gas generator. Another winding is used for arc welding or can be used to supply an arc for atomic oxy-hydrogen welding. It will be appreciated that the transformer is optional and that the generator can be connected directly to the mains. In fact the bridge rectifier is not essential either and can be omitted if desired.

In the operation of apparatus of the type described it is often required to conveniently change between neutral and oxidizing flames, for example when changing from a welding operation to a cutting operation and the present invention makes provision for the variation of these functions. Briefly, in accordance with the present invention, apparatus for either oxy-hydrogen welding or cutting may comprise a first electrolytic generator for generating hydrogen and oxygen by the electrolysis of water in substantially stoichiometric proportions to produce a neutral flame and a further electrolytic generator from which hydrogen and oxygen are separately delivered, which means for adding either the hydrogen from this further cell, or the oxygen from the further generator to the gas mixture obtained from the first generator. This arrangement results in a most efficient combination of functions when a neutral flame or other is required. The hydrogen gas produced by the further generator, when added to the flame mixture, burns with atmospheric oxygen thereby producing a reducing flame. When an oxidizing flame is required, the additional hydrogen is cut off and the oxygen produced by the further generator is added to the flame mixture. It will be appreciated that various designs can be employed for either generator, for example, they may be completely independent or they may share a common electrolyte. The further gas generator can also, in practice, be made somewhat smaller than the other generator since it does not have to produce the bulk of the gas required.

It has been found that welding with hydrogen and oxygen in an exact 2 to 1 ratio (as when the gases are produced electrolytically) results in a particularly clean, oxide free welded surface and a strong welded joint. For the same quality welding to be produced by conventional gas welding technique substantially greater skill is required and, in the case of conventional hydrogen welding, for example, good welded joints are obtained only with great difficulty due to the extreme difficulty in obtaining and maintaining a neutral flame. With the method of the present invention there is no difficulty in obtaining a neutral flame, and hence the ease with which high quality welds can be obtained.

Finally, it can sometimes be convenient to store hydrogen and/or oxygen, generated electrolytically in a specially designed container, or to slowly accumulate these gases and then, when required, using the accumulated stored gas for extra heavy work for a short time. It is quite hazardous to pressurize a mixture of hydrogen and oxygen under very high pressures, of course, but it is possible, in accordance with one aspect of the invention, to store a useful amount of gas in a relatively small volume at low pressures and this can be done by using a highly gas absorbent metal in the storage container. The metal palladium, for example, can absorb up to 900 times its own volume of hydrogen and can be used with advantage for this application. In fact useful amounts of hydrogen, for small scale brazing work can readily be stored in a small hand held container, containing a gas absorbent material.

I claim:
1. Apparatus for generating a supply of hydrogen gas and oxygen gas in proportion to consumption of said gases comprising, a. an electrolytic cell means for electrolytic generation of said gases, said cell being enclosed to entrap said generated gases, b. a gas outlet carried by said cell to allow a portion of said generated gases to discharge from said cell, c. a source of electrical power connected to said cell by a suitable circuit, and d. an electrical power regulating means for controlling the amount of power to said cell including:

a first chamber having a selected cross-sectional area and an upper and lower inlet, said upper inlet connected with said gas outlet of said cell, a second chamber having a selected cross-sectional area at least one half less than that of said first chamber and a lower inlet, said inlet connected to said lower inlet of said first chamber by a suitable passage, a first and second inverted conically-shaped and concentrically aligned resistant electrode carried in a vertical relationship in said first chamber, said electrodes connected in said circuit between said power source and said cell, and a quantity of electrolytic solution carried in said chambers to partially fill said chambers and interface with said electrodes to close said circuit, wherein an increase in the pressure of said entrapped gases depresses the level of said electrolytic solution in said first chamber to cause an increase in resistance of said electrodes thereby reducing the amount of power to said cell.

2. Apparatus for generating a supply of hydrogen and oxygen gases comprising, a. an electrolytic cell means for electrolytic generation of said gases, said cell being enclosed to entrap said generated gases, b. a gas outlet carried by said cell to allow a portion of said generated gases to discharge from said cell, c. a source of electrical power connected to said cell by a suitable circuit, and d. an electrical power regulating means including, a first chamber having a selected cross-sectional area and an upper and lower inlet, said upper inlet connected to said outlet of said cell, a second circular chamber having a preselected cross-sectional area, said area of said second chamber being at least one-half that of said first chamber, and a lower inlet, said inlet connected to said lower inlet of said first chamber by a passage, a quantity of electrolytic solution carried in said chamber to partially fill said chambers, a quantity of non-conductive liquid having a specific gravity less than said electrolytic solution carried in said first chamber above said electrolytic solution, and a first and second electrode carried by said first chamber in a vertical relationship and extending inwardly therein to interface with said electrolyte solution, said electrodes connected in said circuit between said power source and said cell to close said circuit, wherein a sufficient increase in pressure of said entrapped gases depresses the level of said non-conductive liquid and said electrolyte to interface said upper electrode with said non-conductive material whereby said circuit is opened.

3. An apparatus according to claim 2 and further characterized by said apparatus comprising, a flash-back arrestor in the form of an elongated capillary having a first end connected to said outlet of said cell and a second end connected to a gas consumption means.

4. An apparatus according to claim 2 and further characterized by said apparatus comprising, a flash-back arrestor in the form of an elongated capillary having a first end connected to said cell outlet and a second end connected to a gas consumption means.

5. System for generating a supply of hydrogen gas and oxygen gas in proportion to a consumption of said gases and protecting said system comprising:

a. an electrolytic cell means for electrolytically generating said gases, said cell being enclosed to entrap said generated gases, b. a source of electrical power connected to said cell by a suitable circuit, and c. a gas outlet means to allow a discharge of said gases and protect said cell from a flash-back and provide regulation of said gas generation further including, a first vertical chamber having a top inlet connected with said cell and a bottom outlet, a second vertical chamber having a substantially greater cross-sectional area than said first chamber, said second chamber having a top outlet for discharging said gas to a gas consumption means, and a first and second bottom inlet, said first inlet connected to said bottom inlet of said first chamber by a horizontal passage, a third vertical chamber having a bottom inlet connected to said second bottom inlet of said second chamber, said third chamber having a cross-sectional area greater than said first chamber and less than said second chamber, a quantity of electrolytic solution carried in said first, second and third chamber to partially fill said chambers, a first and second inverted, conically-shaped resistant electrodes concentrically aligned and carried by said second chamber in a vertical relationship, said electrodes connected in said circuit to close said circuit when in contact with said electrolyte, wherein an increase in pressure in said second chamber depresses the level of said electrolyte to decrease the generation of said gases by increasing resistance in said circuit by increasing exposed portions of said resistant electrodes, said electrolyte acting as a protective barrier between said gas consumption means and said cell.

6. An apparatus according to claim 5 and further characterized by said apparatus comprising, a flash-back arrestor in the form of an elongated capillary having a first end connected to said cell outlet and a second end connected to a gas consumption means.

* * * * *